US012496736B2

(12) United States Patent
Shimanoff et al.

(10) Patent No.: US 12,496,736 B2
(45) Date of Patent: Dec. 16, 2025

(54) KNIFE WITH SAFETY LOCK

(71) Applicant: Fiskars Brands, Inc., Middleton, WI (US)

(72) Inventors: Lael Abraham Shimanoff, Portland, OR (US); Paul Ernest Hoover Hallbrook, Portland, OR (US); Cheryl Sharp, Portland, OR (US)

(73) Assignee: FISKARS BRANDS, INC., Middleton, WI (US)

( * ) Notice: Subject to any disclaimer, the term of this patent is extended or adjusted under 35 U.S.C. 154(b) by 434 days.

(21) Appl. No.: 17/971,158

(22) Filed: Oct. 21, 2022

(65) Prior Publication Data

US 2023/0126401 A1 Apr. 27, 2023

Related U.S. Application Data

(60) Provisional application No. 63/270,743, filed on Oct. 22, 2021.

(51) Int. Cl.
*B26B 1/04* (2006.01)

(52) U.S. Cl.
CPC .................................... *B26B 1/048* (2013.01)

(58) Field of Classification Search
CPC .. B26B 1/048; B26B 1/00; B26B 1/02; B26B 1/04; B26B 1/042; B26B 1/044; B26B 1/046
USPC ........................... 30/155, 158, 159, 160, 161
See application file for complete search history.

(56) References Cited

U.S. PATENT DOCUMENTS

| | | |
|---|---|---|
| 5,325,588 A | 7/1994 | Rogers |
| 6,256,888 B1 | 7/2001 | Shuen |
| 6,338,431 B1 | 1/2002 | Onion |
| 7,032,315 B1 | 4/2006 | Busse |
| 7,107,686 B2 | 9/2006 | Linn et al. |
| 7,313,866 B2 | 1/2008 | Linn et al. |
| 7,340,837 B1 | 3/2008 | Busse |
| 7,340,838 B2 | 3/2008 | Onion |
| 7,506,446 B2 | 3/2009 | Onion |
| 7,578,064 B2 | 8/2009 | Busse |

(Continued)

FOREIGN PATENT DOCUMENTS

CN 107379023 A 11/2017

OTHER PUBLICATIONS

International Search Report and Written Opinion issued in connection with PCT Appl. Ser. No. PCT/US2022/047424 dated Feb. 17, 2023 (11 pages).

*Primary Examiner* — Phong H Nguyen
(74) *Attorney, Agent, or Firm* — FOLEY & LARDNER LLP

(57) ABSTRACT

A knife includes a handle defining a slot having a first portion and a second portion, a blade coupled to the handle, and a locking assembly configured to secure the blade within the handle. The locking assembly includes a lock button configured to translate between a first position proximate the first portion of the slot and a second position proximate the second portion of the slot, wherein a spindle is configured to translate within the slot, and a spring arm configured to bias the lock button, wherein the spring arm biases the lock button towards the first position while the spindle is within the first portion of the slot and biases the lock button towards the second position while the spindle is within the second portion of the slot.

19 Claims, 12 Drawing Sheets

(56) References Cited

U.S. PATENT DOCUMENTS

| | | | |
|---|---|---|---|
| 7,698,821 B2 | 4/2010 | Ralph | |
| 7,748,122 B2 | 7/2010 | Duey | |
| 7,774,939 B1 | 8/2010 | Onion | |
| 8,171,645 B2 | 5/2012 | Duey | |
| 8,375,590 B2 | 2/2013 | Duey | |
| 8,572,851 B2 | 11/2013 | Duey | |
| 9,862,104 B2 | 1/2018 | France | |
| 10,828,792 B2 | 11/2020 | Hagström | |
| 10,899,024 B2 | 1/2021 | Duey | |
| 2003/0019108 A1 | 1/2003 | McHenry et al. | |
| 2005/0262701 A1 | 12/2005 | Lai | |
| 2006/0230620 A1 | 10/2006 | Steigerwalt et al. | |
| 2006/0248728 A1 | 11/2006 | Gibbs | |
| 2012/0144677 A1* | 6/2012 | Chang | B26B 1/044 30/161 |
| 2014/0053409 A1* | 2/2014 | Pardue | B26B 1/044 30/159 |
| 2015/0101197 A1* | 4/2015 | Feng | B26B 1/02 30/155 |
| 2015/0352731 A1* | 12/2015 | France | B26B 1/048 30/159 |
| 2016/0121493 A1 | 5/2016 | Ikoma | |
| 2017/0106544 A1* | 4/2017 | Hoppe | B26B 1/044 |

* cited by examiner

KNIFE WITH SAFETY LOCK

CROSS-REFERENCES TO RELATED APPLICATIONS

This application claims the benefit of priority to U.S. Provisional Patent Application No. 63/270,743, filed on Oct. 22, 2021, which is hereby incorporated by reference herein in its entirety for all purposes.

TECHNICAL FIELD

The present disclosure relates generally to hand tools, and more specifically, to hand tools including a knife and a locking mechanism.

BACKGROUND

The present invention relates generally to locking mechanisms and in particular a locking mechanism for an assisted opening knife to prevent inadvertent opening of knife.

SUMMARY

One exemplary embodiment relates to a knife. The knife includes a handle defining a slot configured to receive a spindle of a lock button, the slot having a first portion and a second portion, a blade including a tang having a first leg and a second leg coupled to the handle, wherein the blade is rotatable between a closed position and an open position, and a locking assembly configured to secure the blade in the closed position within the handle. The locking assembly includes the lock button including the spindle coupled to a first end button and a second end button and configured to translate between a locked position proximate the first portion of the slot and an unlocked position proximate the second portion of the slot, wherein the spindle is configured to translate within the slot such that the spindle is received between the first leg and the second leg when the blade is in the closed position and the lock button is in the locked position and a spring arm configured to bias the lock button, wherein the spring arm biases the lock button towards the locked position while the spindle is within the first portion of the slot and biases the lock button towards the unlocked position while the spindle is within the second portion of the slot. According to various embodiments, the first leg includes an angled face configured to interface with the spindle while the lock button is in the locked position to bias the lock button to translate from the locked position to the unlocked position as the blade rotates from the open position to the closed position.

According to various embodiments, the handle includes a liner, wherein the spring arm is integrally formed with the liner. The spring arm may include a first angled portion configured to bias the lock button towards the locked position and a second angled portion configured to bias the lock button towards the unlocked position. The spring arm may include an inflection point, wherein the inflection point separates the first portion of the slot and the second portion of the slot. The liner may include a liner lock configured to lock the blade in the open position. The knife may include a wire spring configured to assist both opening and closing of the knife. The knife may further include a stopper coupled to the handle, wherein the angled face engages the stopper when the blade is in the closed position.

According to another exemplary embodiment, a knife includes a handle defining a first slot configured to receive a spindle of a lock button, a blade rotatably coupled to the handle and configured to rotate between a closed position and an opened position, the blade including a tang that defines a second slot, and a locking assembly configured to secure the blade within the handle. The locking assembly includes the lock button including the spindle configured to translate within the first slot between a first position and a second position and configured to be received within the second slot when the blade is in the closed position to prevent rotation of the blade relative to the handle.

According to various embodiments, the first slot may include a first portion and a second portion, and the locking assembly may include a spring arm configured to bias the lock button, wherein the spring arm biases the lock button towards the first position while the spindle is within the first portion of the first slot and biases the lock button towards the second position while the spindle is within the second portion of the first slot. The spring arm may be defined by a cutout in a liner of the knife. The spring arm may include including a first angled portion configured to bias the lock button towards the first position and a second angled portion configured to bias the lock button towards the second position. The spring arm may include an inflection point, wherein the inflection point separates the first portion of the first slot and the second portion of the first slot. The handle may include a liner, wherein the spring arm is integrally formed with the liner. According to various embodiments, the second slot is at least partially defined by a leg, wherein the leg may include a surface opposite the second slot, wherein the surface is configured to push the spindle from the first position to the second position as the blade rotates from the opened position to the closed position.

According to another exemplary embodiment, a folding knife includes a handle, a blade rotatably coupled to the handle and configured to rotate between a closed position and an opened position, the blade defining a slot defined by a first leg and a second leg, wherein the first leg may include a surface opposite the slot, and a locking assembly configured to secure the blade within the handle. The locking mechanism includes a lock button including a spindle is configured to translate relative to the handle between a first position and a second position, wherein the spindle is configured to be received by the slot in the blade to prevent rotation of the blade relative to the handle while the lock button is in the first position, and the surface is configured to push the spindle from the first position to the second position as the blade rotates from the opened position to the closed position.

According to various embodiments, the handle may include a handle slot and the spindle translates within the handle slot between the first position and the second position. The handle slot may include a first portion and a second portion, and the locking assembly may include a spring arm configured to bias the lock button, wherein the spring arm biases the lock button towards the first position while the spindle is within the first portion of the handle slot and biases the lock button towards the second position while the spindle is within the second portion of the handle slot. The spring arm may be defined by a cutout in a liner of the folding knife. The spring arm may include including a first angled portion configured to bias the lock button towards the first position and a second angled portion configured to bias the lock button towards the second position. The handle may include a liner, wherein the spring arm is integrally formed with the liner.

BRIEF DESCRIPTION OF THE FIGURES

The invention will become more fully understood from the following detailed description, taken in conjunction with the accompanying drawings, in which.

DETAILED DESCRIPTION

Figure 1:
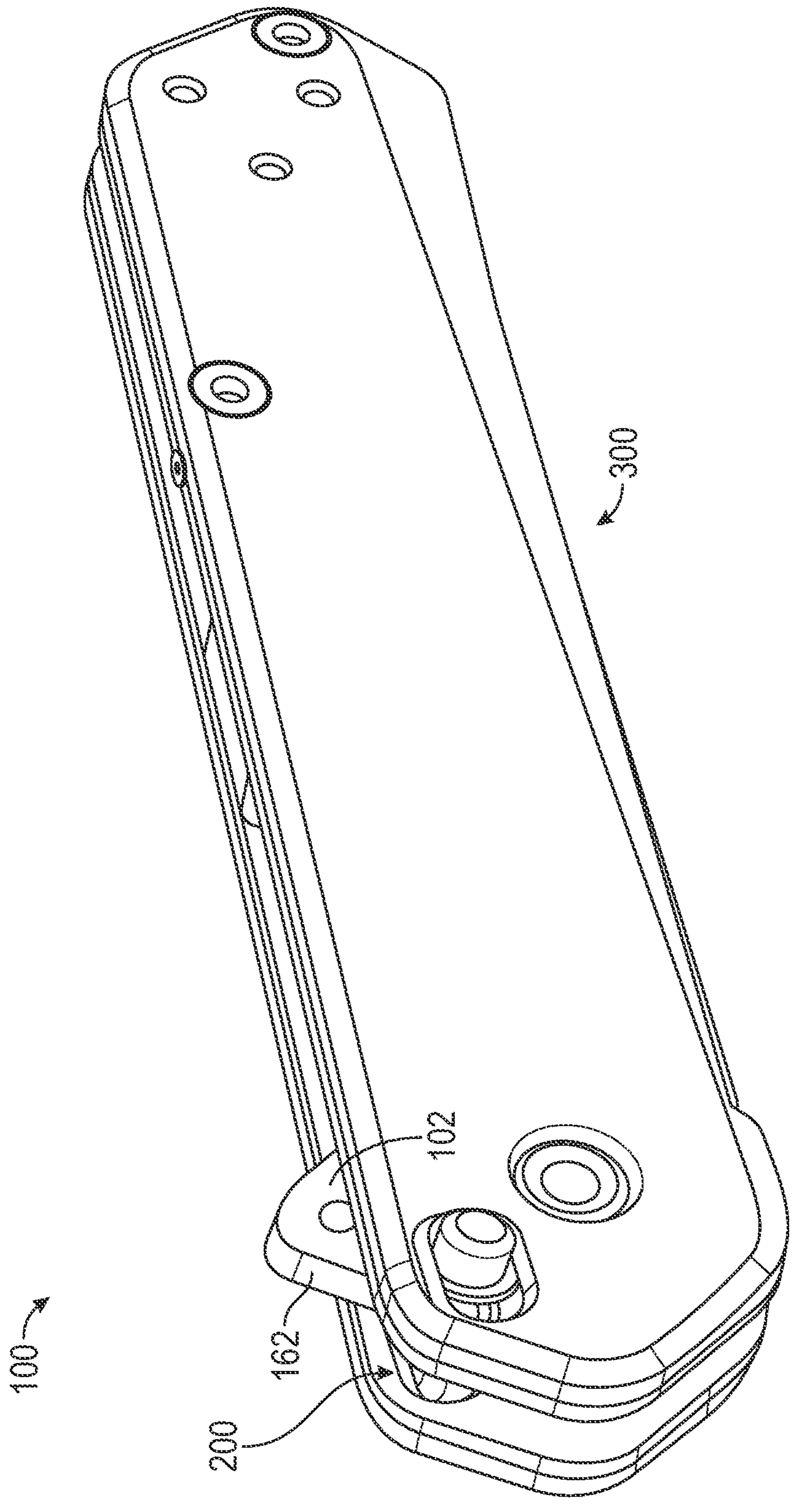
FIG. 1 is a perspective view of a knife with a blade in a closed position, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a knife is disclosed. The knife includes a handle defining a slot having a first portion and a second portion, a blade coupled to the handle, and a locking assembly configured to secure the blade within the handle. For example, the blade may rotate relative to the handle between a first position (e.g., an open position) and a second position (e.g., a closed position). According to various embodiments, the locking assembly may secure the blade in the second position. The locking assembly includes a lock button configured to translate between a first position (e.g., a locked position) proximate the first portion of the slot and a second position (e.g., an unlocked position) proximate the second portion of the slot. For example, a user of the knife may apply a force to the lock button, thereby causing a portion of the lock button (e.g., a spindle) to translate within the slot of the handle, thereby unlocking the blade such that the blade may rotate relative to the handle or locking the blade such that the blade is prevented from rotating relative to the handle. According to various embodiments, a biasing mechanism is configured to bias the lock button. For example the biasing mechanism may bias the lock button towards the first position while the portion of the lock button is within the first portion of the slot. Further, the biasing mechanism may bias the lock button towards the second position while the portion of the lock button is within the second portion of the slot. In this sense, the biasing member may assist a user of the knife in both locking and unlock the blade.

According to various embodiments, the biasing mechanism is a spring arm configured to apply a force to the portion of the lock button. For example, the spring arm may be defined by a cutout in the liner of the knife. According to various embodiments, the spring arm includes a first angled portion configured to bias the lock button towards the first position and a second angled portion configured to bias the lock button towards the second position. According to various embodiments, the biasing mechanism includes an inflection point, wherein the inflection point separates the first portion of the slot and the second portion of the slot. According to various embodiments, the blade defines a blade slot configured to receive a portion of the lock button such that the blade is prevented from rotating relative to the handle. For example, when the lock button is in the second position (e.g., locked position) in the slot in the handle, a portion of the lock button may be received by the slot in the blade, thereby preventing the blade from rotating relative to the handle. According to various embodiments, the blade slot is at least partially defined by a leg, wherein the leg includes a surface opposite the slot, wherein the surface is configured to push the portion of the lock button from the first position to the second position as the blade rotates from an opened position to a closed position. According to various embodiments, the surface may be an angled or curved such that the contour of the surface reduces the likelihood of damage to the lock button as the surface pushes the lock button from the locked position to the unlocked position.

Figure 2:
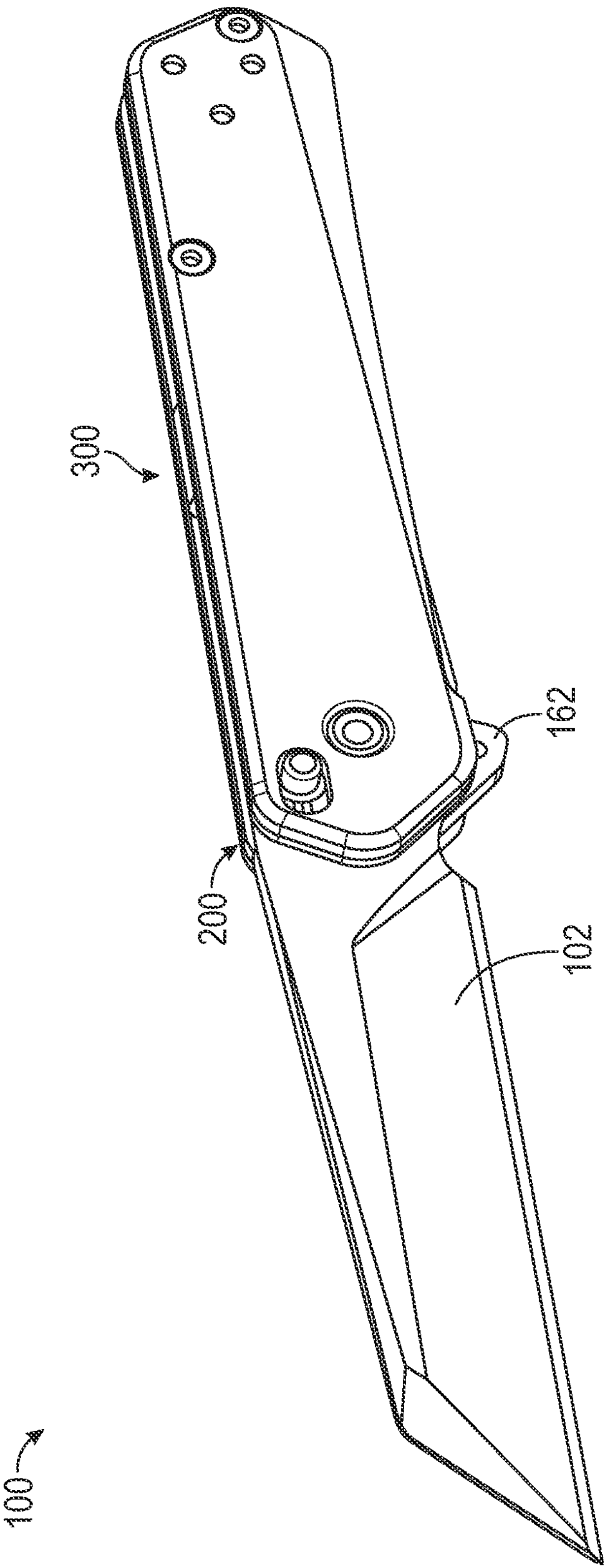
FIG. 2 is a perspective view of the knife of FIG. 1 with the blade in the open positon.

Referring now to FIGS. 1 and 2, perspective views of a knife 100 (e.g., a folding knife) in a first orientation and a second orientation, respectively, are shown according to an example embodiment. As shown in FIG. 1, the knife 100 is in a first orientation (e.g., a closed orientation, a folded orientation, etc.) such that a blade 102 is in a closed position. In the first orientation, the blade 102 is at least partially within the handle 300 of the knife 100. Additionally, as is discussed further herein, the knife 100 includes a locking assembly 200 configured to selectively secure the blade 102 at least partially within the handle 300. For example, when the knife 100 is in the first orientation (e.g., the closed orientation), the locking assembly 200 may secure the blade 102 within the handle 300 to prevent inadvertent opening of the knife 100. The locking assembly 200 may then be manipulated by a user of the knife 100 to unlock the locking assembly 200 such that the blade 102 may be rotated outside of the handle 300 (e.g., by applying a force to the flipper 162 of the blade 102) into a second position (e.g., an opened position), as shown in FIG. 2.

Figure 3:
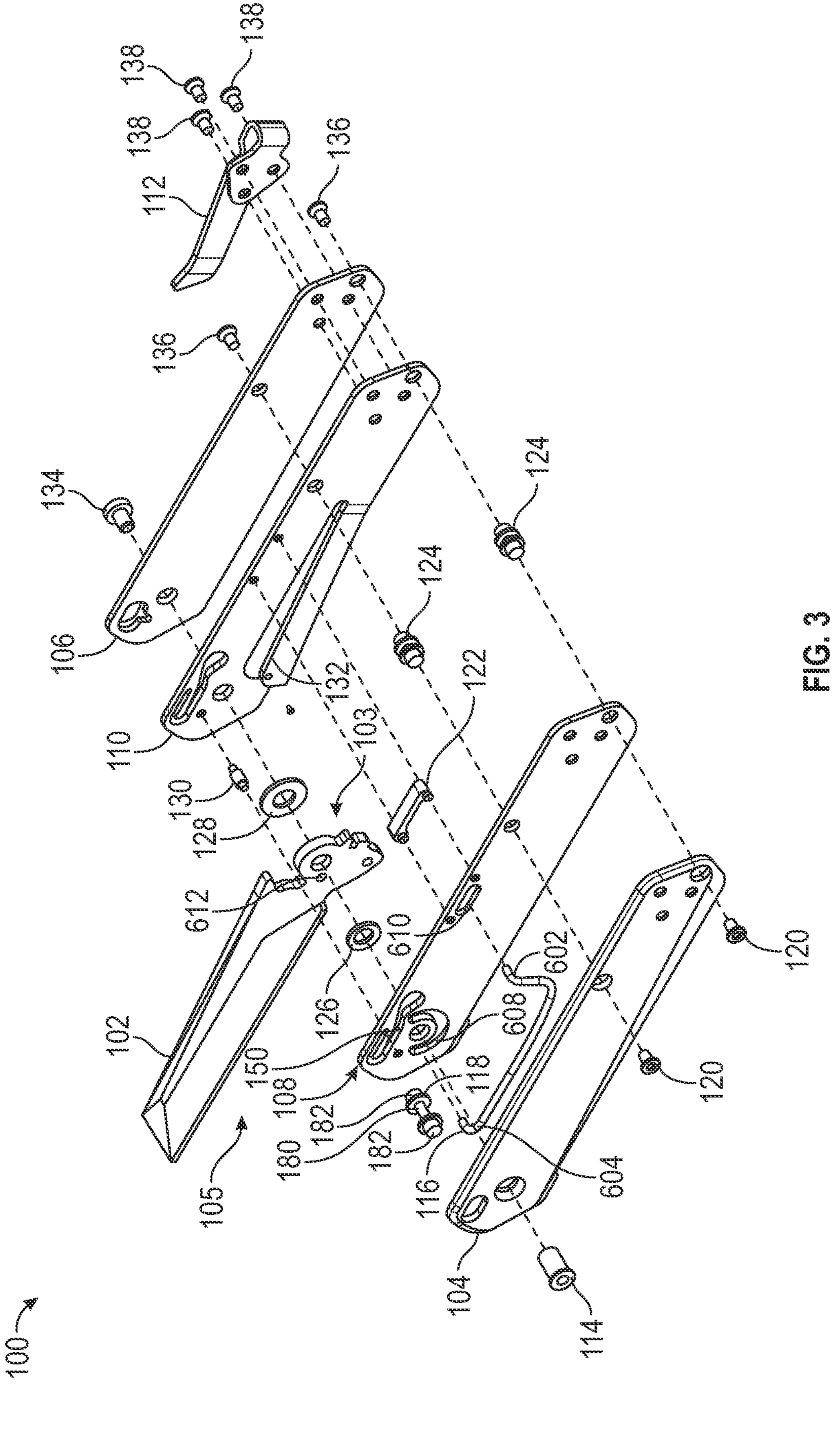
FIG. 3 is an exploded view of the knife of FIG. 1.

Referring now to FIG. 3, an exploded view of the folding knife of FIG. 1, according to an example embodiment. As shown, the knife 100 includes a blade 102 and a handle 300. The blade 102 includes a cutting edge 105 and a tang 103 opposite the cutting edge 105. When assembled, the blade 102 is rotatable coupled to the handle 300. For example, a first fastener 114 and a second fastener 134 may extend through the handle 300 and an aperture 202 in tang 103 of the blade 102 to rotatably couple the blade 102 to the handle 300. Further, the first fastener 114 and the second fastener 134 extend though a first washer 126 and a second washer 128. The first washer 126 and the second washer 128 may be used to space the blade 102 apart from various components of the handle 300.

As shown, the handle 300 includes a first scale 104 and a second scale 106. The handle 300 further includes a first liner 108 and a second liner 110 positioned between the first scale 104 and the second scale 106. The first liner 108 and the second liner 110 may be manufactured from a metal (e.g., steel, aluminum, an alloy, etc.) to provide additional mechanical strength to the handle 300. As shown, a plurality of fasteners 120 extends through openings in the first scale and the first liner 108, another plurality of fasteners 136 extends through a plurality of openings in the second scale 106 and the second liner 110. The plurality of fasteners 120, 136 are each coupled with another plurality of fasteners 124 to secure the first scale 104 and the first liner 108 to the second scale 106 and the second liner 110.

As shown, the second liner 110 includes a liner lock with a lock arm 132 that is angled towards the blade 102. The lock arm 132 may interface with the blade 102 while the blade 102 is in the closed position. As the blade 102 rotates relative to the handle 300 into the open position, the lock arm 132 interfaces with the blade 102 to lock the blade into the open position. For example, the lock arm 132 may press against the blade 102 while the blade 102 is in the closed position. Once the blade 102 is rotated to the open position, the lock arm 132 may deflect into a cavity in the handle 300 (e.g., towards the first liner 108) such that the lock arm 132 prevents the blade 102 from being rotated into the closed position. A user of the knife 100 may then manually depress the lock arm 132 away from the first liner 108 to allow the blade 102 to be rotated back to the closed position.

The knife 100 further includes a clip 112 coupled to the handle 300. For example, one or more fasteners 138 may be used to secure the clip 112 to the second scale 106. The clip 112 may enable a user of the knife 100 to secure the knife 100 to another object (e.g., a belt, pants, a tool bag, etc.).

The knife 100 further includes an assist assembly configured to facilitate opening and closing of the knife 100. As shown, the assist assembly includes a wire spring 116 coupled to the first liner 108 and the blade 102 (e.g., within an aperture 612 in the tang 103 of the blade 102). Further, the assist assembly includes a retention member 122 coupled to the first liner 108 and the second liner 110. As the blade 102 rotates from the closed position to the open position, a first portion of the wire spring 116 proximate a first end 604 translates within a first slot 608 in the first liner 108 and a second portion of the wire spring 116 proximate the second end 602 translates within a second slot 610 in the first liner 108. The wire spring 116 is configured to assist both opening and closing of the knife 100. For example, as the blade 102 rotates from the closed position to the open position, the blade 102 will rotate past an inflection point. Once rotated past the inflection point, the wire spring 116 will bias the blade 102 towards the open position. As the blade 102 is rotated from the open position to the closed position, the blade 102 will again pass the inflection point. Once rotated past the inflection point, the wire spring 116 will bias the blade 102 towards the closed position.

As is discussed further herein, the knife 100 further includes a locking assembly 200 configured to lock the knife 100 in the closed position. The locking assembly 200 includes a lock button 118 configured to translate within a slot 140 (see FIGS. 4 and 5) in the handle 300. The lock button 118 includes a spindle 180 coupled to a first end button 182 and a second end button 182. As is discussed below, the spindle 180 may translate within the slot 140 to lock the knife 100 in the closed position. Further, the first liner 108 includes a biasing mechanism 150 configured to apply a biasing force to the spindle 180 to bias the lock button 118 towards an unlocked position and a locked position.

Figure 4:
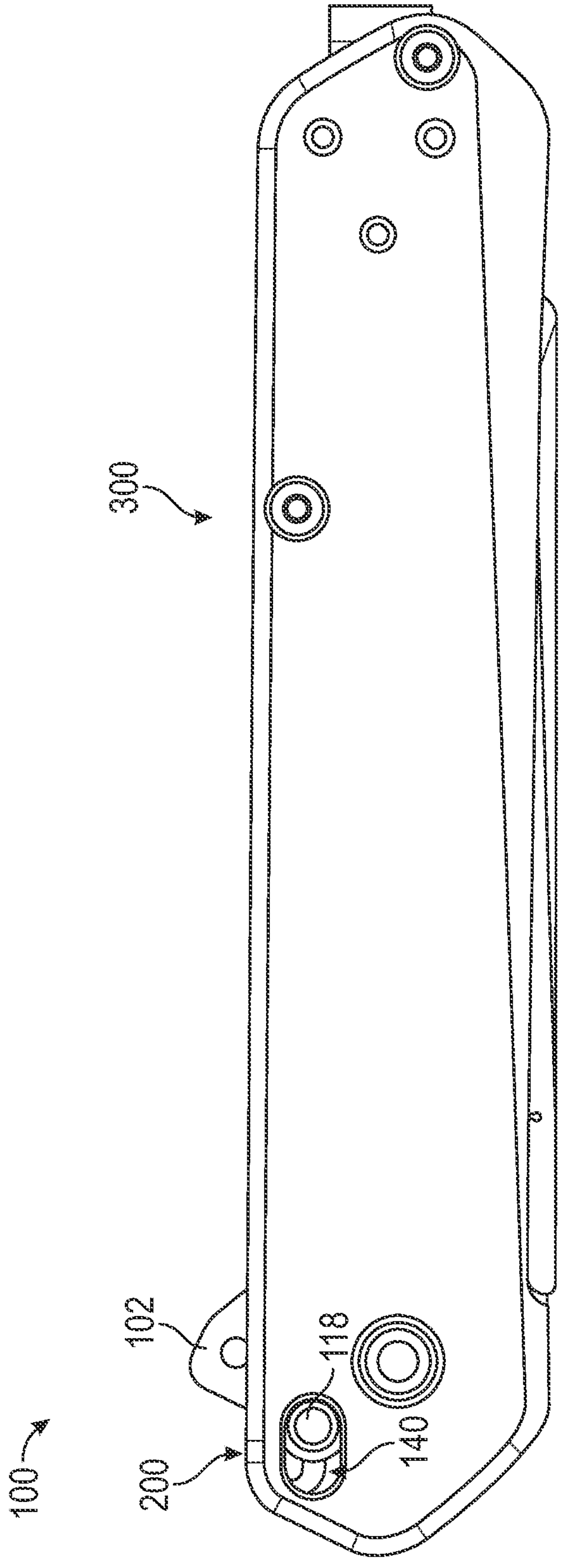
FIG. 4 is a side view of the knife of FIG. 1 with a lock button in a first position.
Figure 5:
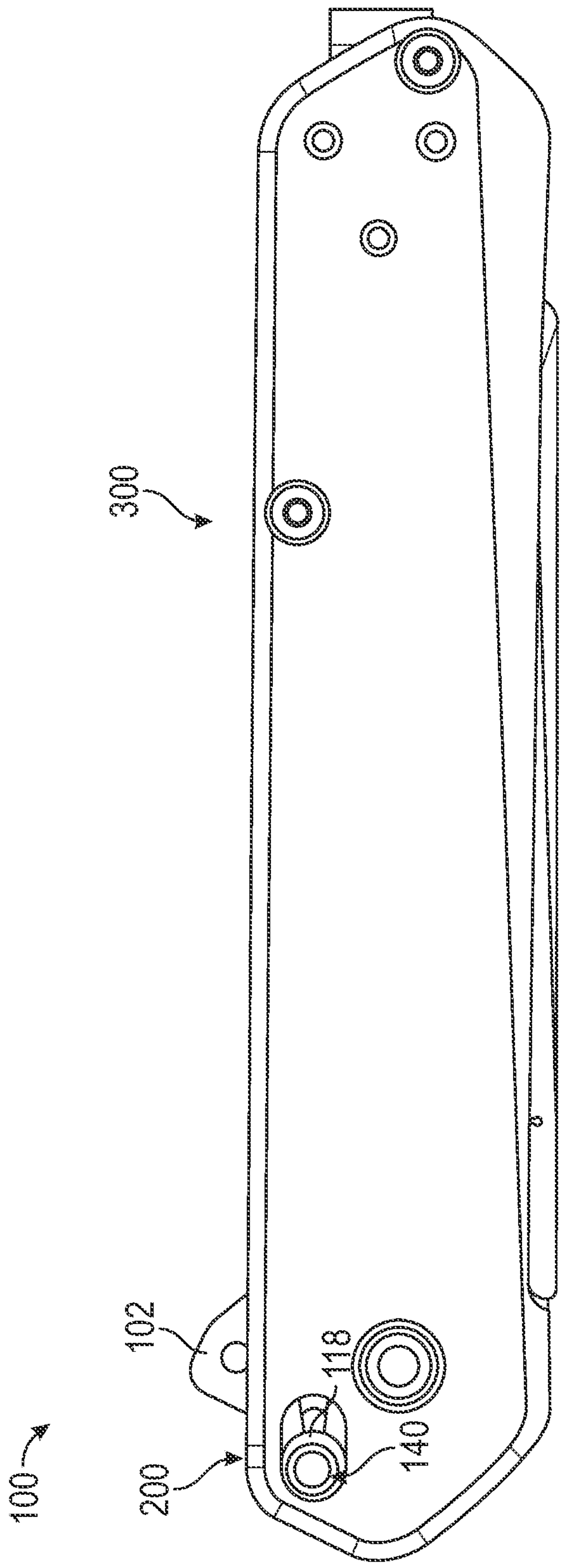
FIG. 5 is another side view of the knife of FIG. 1 with the lock button in a second position.

Referring now to FIGS. 4 and 5, side views of the locking assembly 200 of the knife 100 are shown with the lock button 118 in a locked position and an unlocked position, respectively. To unlock the blade 102 such that the blade 102 may rotate relative to the handle 300, a user may apply a force to the lock button 118 such that the lock button 118 translates within a slot 140 in the handle 300. Referring back to FIG. 3, the slot 140 is defined by an opening in the first scale 104, the second scale 106, the first liner 108, and the second liner 110. Further, as is discussed in more detail herein, the slot 140 defines a first portion and a second portion. For example, the lock button 118 is positioned within the first portion of the slot 140 in FIG. 4 and the second portion of the slot 140 in FIG. 5.

Figure 6:
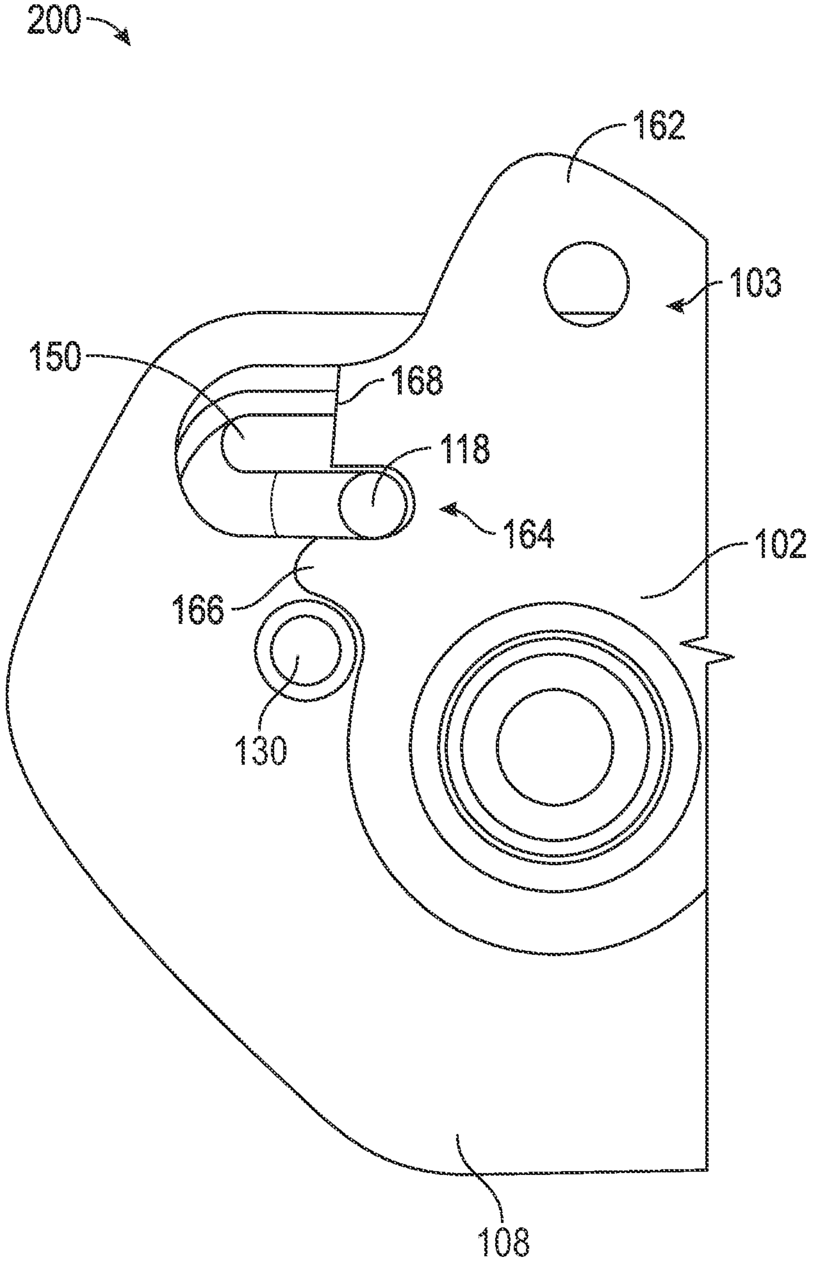
FIG. 6 is a partial view of a locking assembly of the knife of FIG. 1.
Figure 7:
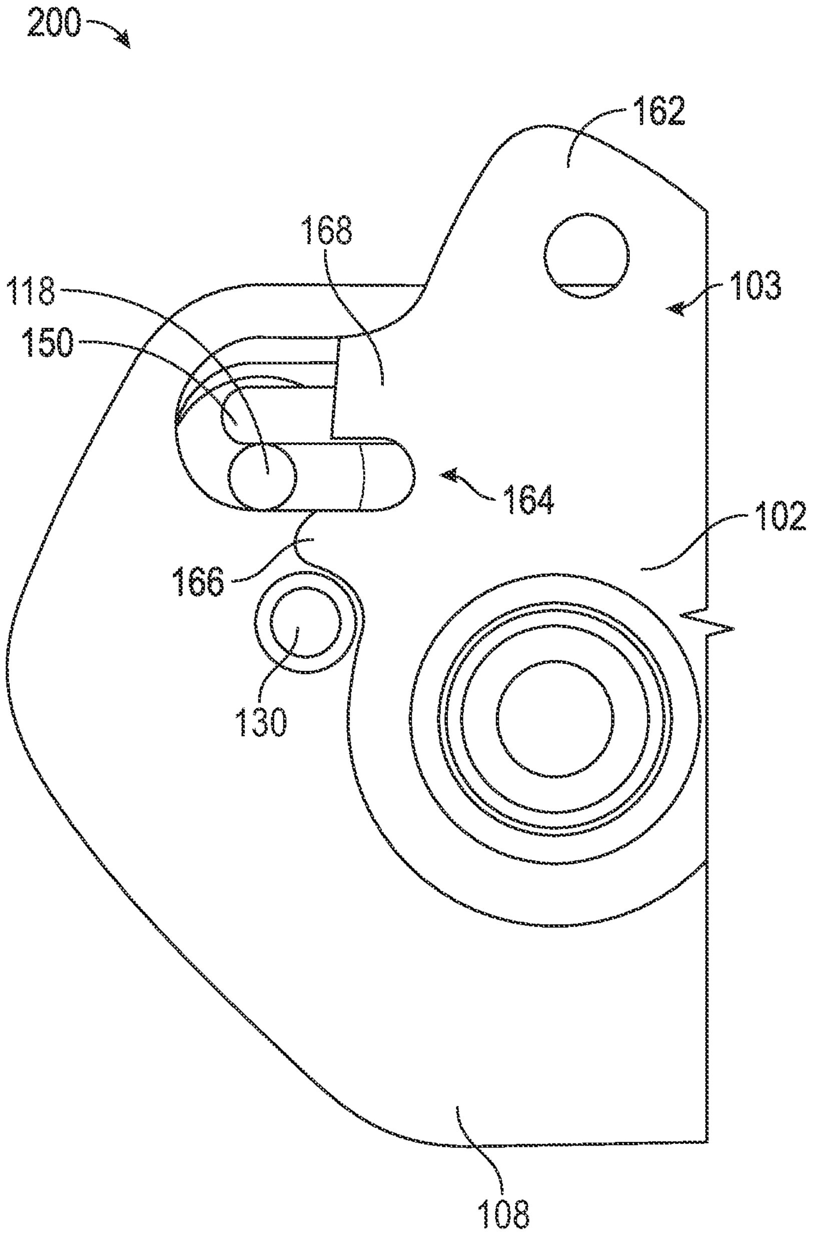
FIG. 7 is another partial view of the locking assembly of FIG. 6.
Figure 8:
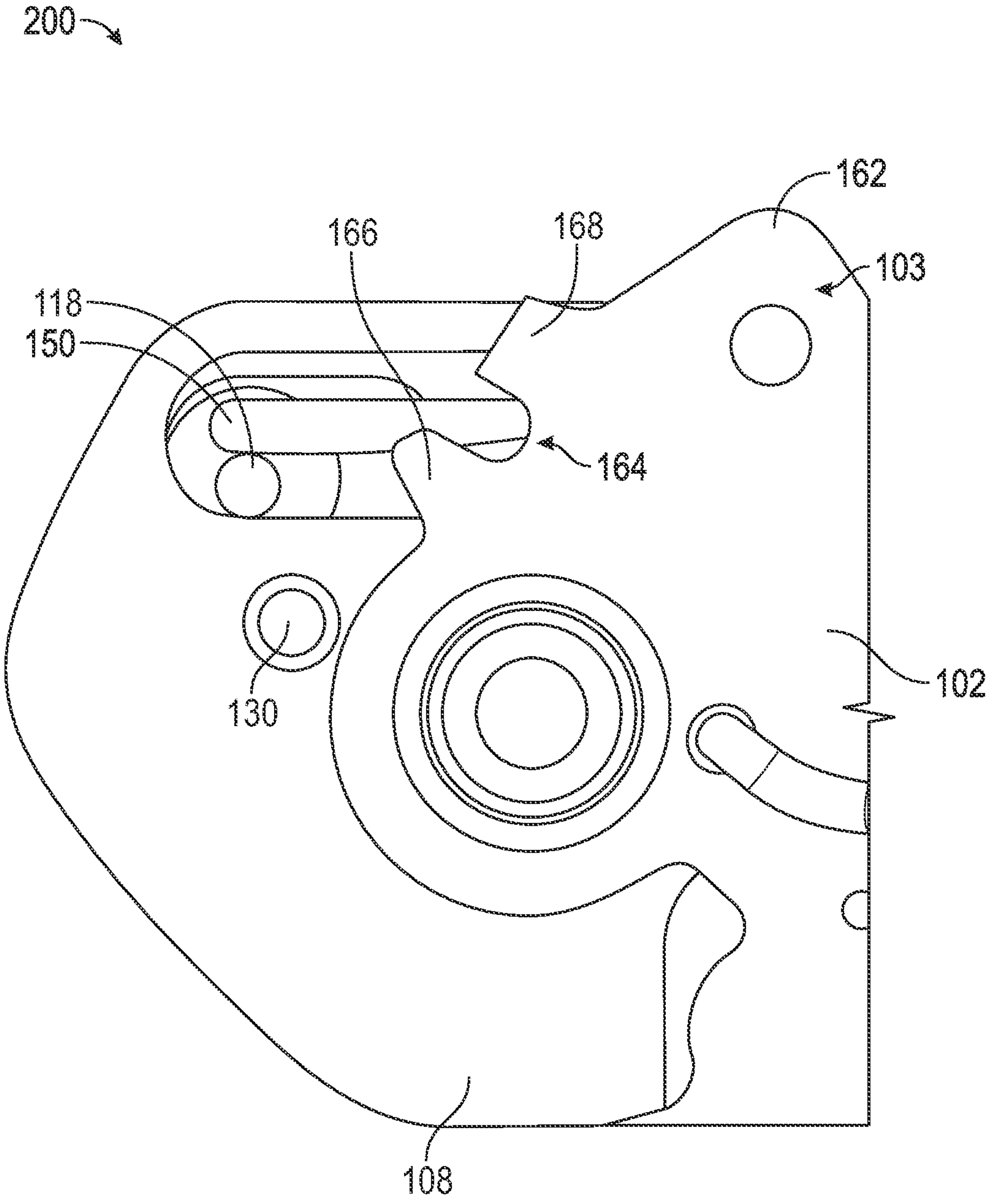
FIG. 8 is another partial view of the locking assembly of FIG. 6.

Referring now to FIGS. 6-8, a partial view of a locking assembly 200 is shown, according to an example embodiment. In FIG. 6, the blade 102 is in a closed position and the lock button 118 is in the locked position. In FIG. 7, the blade 102 is in the closed position and the lock button 118 is in the unlocked position. In FIG. 8, the blade 102 is between the closed position and the open position and the lock button is in the unlocked position.

As shown in FIG. 6, the tang 103 of the blade 102 includes a first leg 166 and a second leg 168 that define a slot 164 (e.g., a tang slot) configured to receive a portion of the lock button 118 (e.g., the spindle 180) to prevent the blade 102 from rotating relative to the handle 300 of the knife. For example, subsequent to rotating the blade 102 from an open position to a closed position, a user of the knife 100 may apply a force to the lock button 118 to cause the lock button 118 to translate from an unlocked position (see, e.g., FIGS. 5 and 7) to a locked position (see, e.g., FIGS. 4 and 6). When the blade 102 is in the closed position and the lock button 118 translates to the locked position, a portion of the lock button 118 (e.g., the spindle 180) is received by the slot 164 in the tang 103 of the blade 102, which prevents rotation of the blade 102 relative to the handle 300, as shown in FIG. 6. According to various embodiments, the slot 164 may be generally U-shaped. The rounded edges of the U-shaped slot 164 may reduce the likelihood of damage to the lock button 118 if a user attempts to open the knife 100 while the lock button 118 is in the locked position.

To deploy the blade 102 from a closed position to an open position, a user of the knife 100 may apply a force to the lock button 118 to cause the lock button 118 to translate from the locked position (see, e.g., FIGS. 4 and 6) to the unlocked position (see, e.g., FIGS. 5 and 7). Doing so will cause the portion of the lock button 118 (e.g., the spindle 180) to translate out of the slot 164, such that the lock button 118 no longer prevents rotation of the blade 102 relative to the handle 300. A user may then deploy the blade 102 (e.g., by applying a force to the flipper 162), such that the blade 102 rotates out of the handle 300 into an opened position.

The locking assembly 200 further includes a biasing mechanism 150 configured to bias the lock button 118 towards the locked position and the unlocked position. For example, as is discussed further herein, the biasing mechanism 150 biases the lock button 118 towards the locked position while the lock button 118 is in the first portion of the slot 140 and the biasing mechanism 150 biases the lock button 118 towards the unlocked position while the lock button 118 is in the second portion of the slot 140. As shown, the biasing mechanism 150 is a spring arm that is integrally formed with the first liner 108. For example, the spring arm may be defined by a cutout in the first liner 108. According to various embodiments, the biasing mechanism 150 may be a different mechanism, such as a linear spring, a wire, etc. Further, according to various embodiments, both the first liner 108 and the second liner 110 may include a biasing mechanism. For example, the first liner 108 and the second liner 110 may both include the biasing mechanism 150 configured to bias the lock button 118 towards the locked position and the unlocked position.

Further, the locking assembly 200 includes a stopper 130 coupled to the first liner 108. The stopper may interface with the first leg 166 to limit the amount of rotation of the blade 102 relative to the handle 300. For example, as shown in FIGS. 6 and 8, when the blade 102 is in the closed position, the first leg 166 contacts the stopper 130 to limit the rotation of the blade 102. This may prevent the blade 102 from rotating through the handle 300 such that the cutting edge is exposed though the handle 300.

Figure 9:
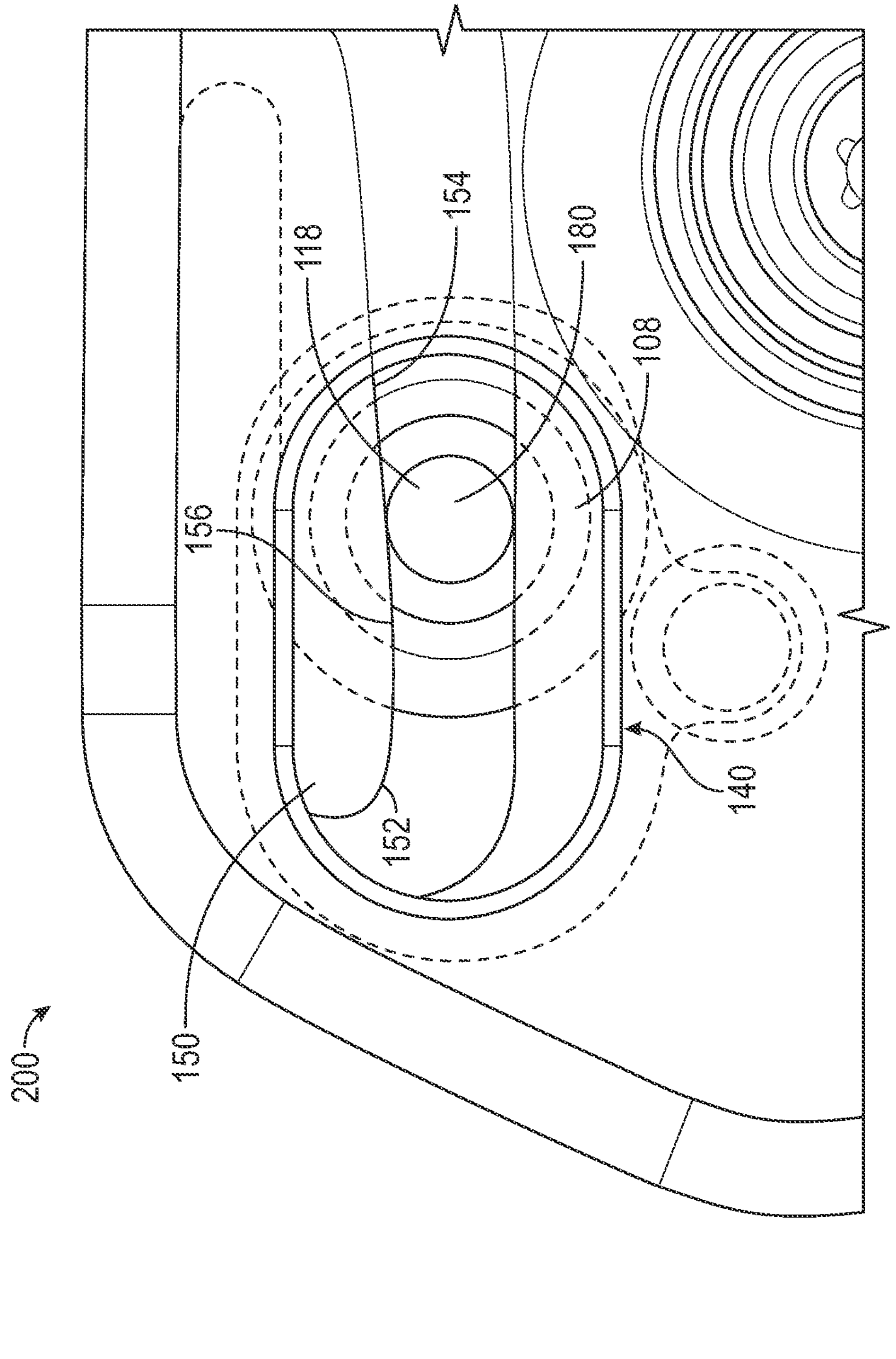
FIG. 9 is another partial view of the locking assembly of FIG. 6.
Figure 10:
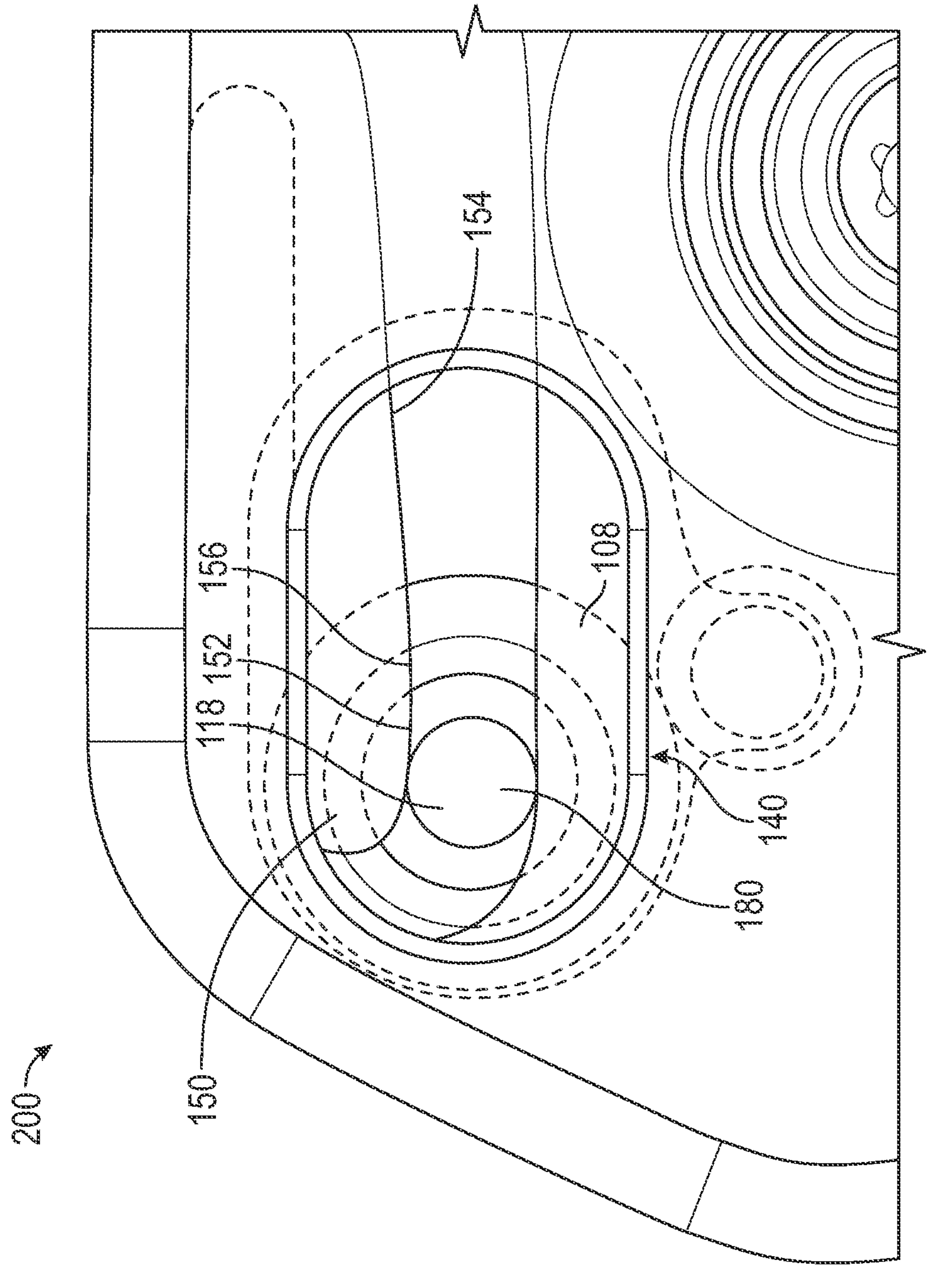
FIG. 10 is another partial view of the locking assembly of FIG. 6.

Referring now to FIGS. 9 and 10, partial views of the locking assembly 200 are shown, according to an example embodiment. The lock button 118 is shown in the locked position in FIG. 9 and the unlocked position in FIG. 10, according to an example embodiment. As shown, the biasing mechanism 150 includes a first angled portion 152 and a second angled portion 154, wherein an inflection point 156 separates the first angled portion 152 and the second angled portion 154. According to various embodiments, the biasing mechanism 150 generally applies a downward (e.g., when the knife 100 is viewed from the side as shown in FIGS. 9 and 10) force to the lock button 118. Further, the first angled portion 152 is angled such that the biasing mechanism 150 further applies a biasing force to the lock button that biases the lock button towards the unlocked position (e.g., as shown in FIG. 10) when the lock button is to the right (e.g., when the knife 100 is viewed from the side as shown in FIGS. 9 and 10) of the inflection point 156 (e.g., when the lock button 118 is in the second portion of the slot 140). The second angled portion 154 is angled such that the biasing mechanism 150 applies a biasing force to the lock button that biases the lock button towards the locked position (e.g., as shown in FIG. 9) when the lock button is to the left (e.g., when the knife 100 is viewed from the side as shown in FIGS. 9 and 10) of the inflection point 156 (e.g., when the lock button 118 is in the first portion of the slot 140). Thus, the inflection point 156 separates the slot 140 into a first portion (e.g., corresponding with the first angled portion 152) and a second portion (e.g., corresponding with the second angled portion 154). In this sense, the biasing mechanism 150 may assist a user of the knife 100 while the user moves the lock button 118 within the slot 140. Further, the biasing mechanism 150 provides a biasing force that facilitates retaining the lock button 118 in either the locked position or the unlocked position to reduce the risk of accidental locking and unlocking of the blade 102.

Figure 11:
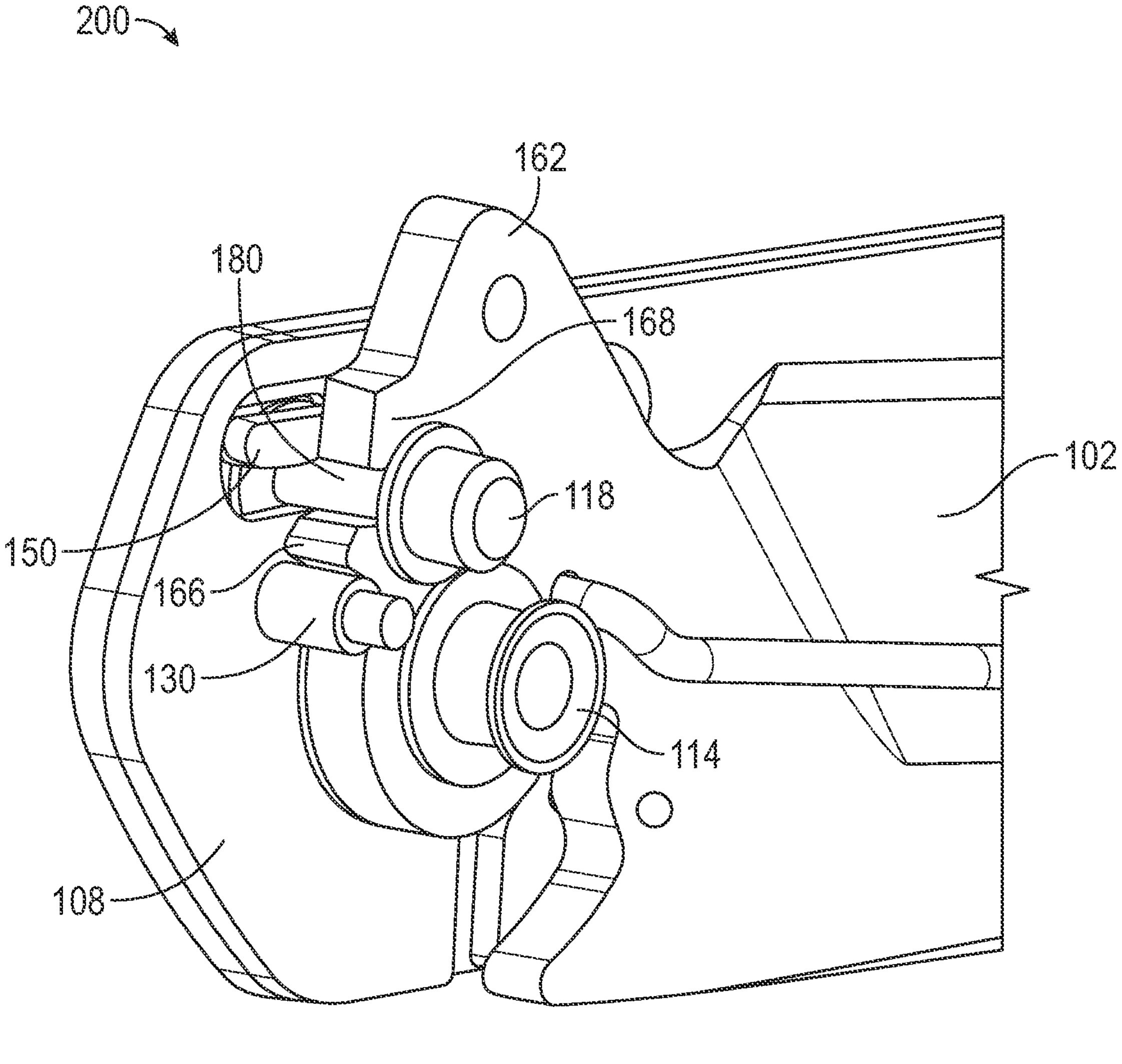
FIG. 11 is another partial view of the locking assembly of FIG. 6.
Figure 12:
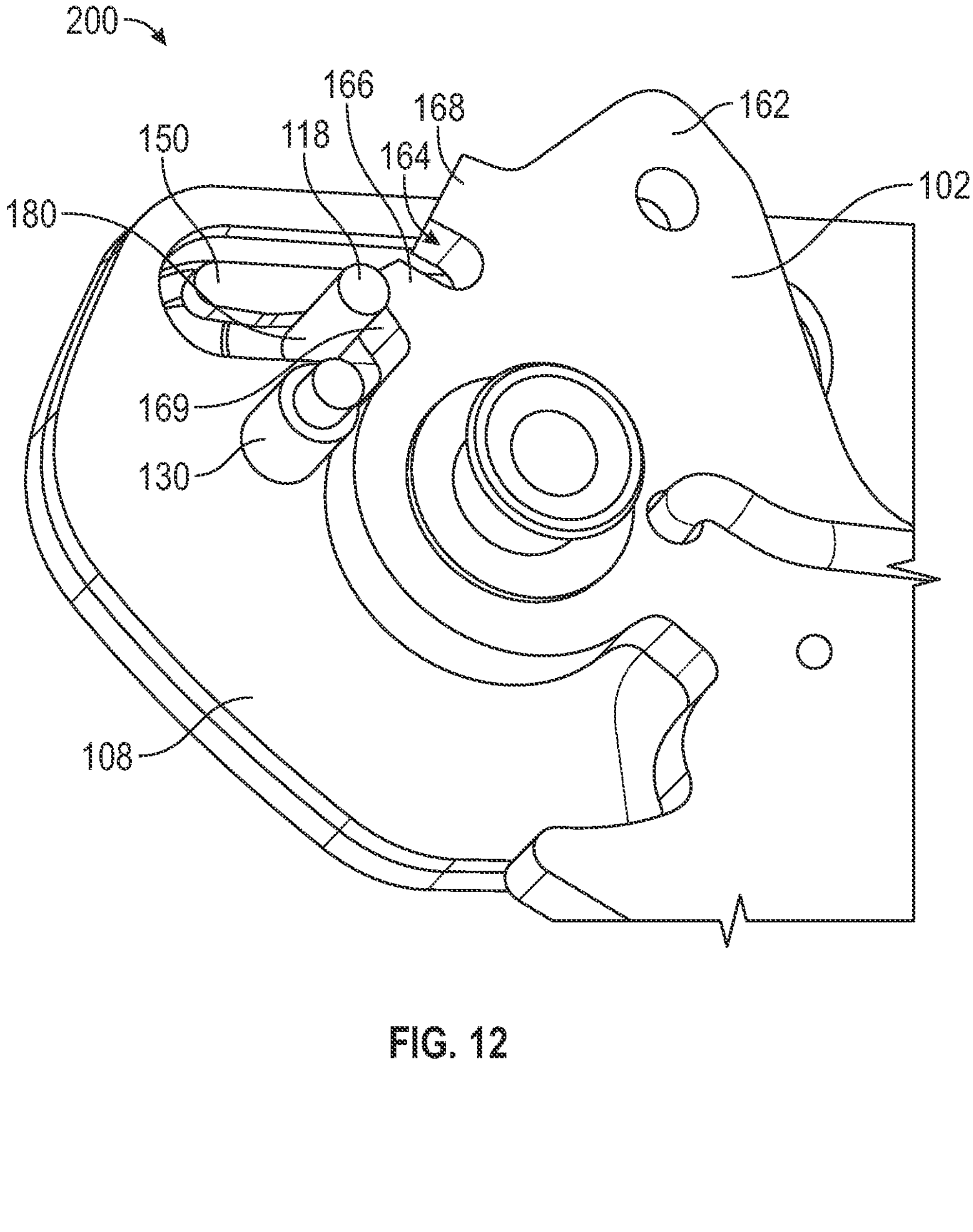
FIG. 12 is another partial view of the locking assembly of FIG. 6.

Referring now to FIGS. 11 and 12, partial views of the locking assembly 200 are shown, according to an example embodiment. In FIG. 11, the lock button 118 is in the locked position and the blade 102 is in the closed position, such that a portion of the lock button 118 (e.g., the spindle 180) is with the slot 164 of the blade (see FIG. 6), thereby preventing rotation of the blade 102 relative to the handle 300. In FIG. 12, the blade 102 is between the opened position and the closed position, and the lock button 118 is in the locked position. The configuration shown in FIG. 12 may occur, for example, if a user of the knife 100 unlocks the locking assembly 200, deploys the blade 102, and subsequently causes the lock button 118 to move back into the locked position while the blade 102 is deployed. A user of the knife 100 may then attempt to rotate the blade 102 into the closed position while the lock button 118 is in the locked position. As the blade 102 rotates from the open position to the closed position, a face 169 of the first leg 166 may interface with the lock button 118, as shown in FIG. 12. The face 169 may push the lock button 118 towards the unlocked position as the blade rotates towards the closed position such that the lock button 118 is pushed out of the locked position and the blade 102 may be rotated into the closed position without being impeded by the lock button 118.

According to various embodiments, the face 169 is configured to push the lock button 118 past the inflection point 156 (see FIG. 9) such that the biasing mechanism 150 biases the lock button 118 towards the unlocked position. For example, as the blade 102 rotates from the open position to the closed position, the face 169 may push the lock button 118 from the locked position and to the inflection point 156. At this point, the biasing mechanism 150 may apply a biasing force to the lock button 118 that causes the lock button 118 to translate to the unlocked position. Once the blade 102 is within the handle 300, a user of the knife 100 may then cause the lock button 118 to translate back into the locked position to secure the blade 102 within the handle 300.

As shown, the face 169 includes an angled surface that extends into a rounded portion. According to various embodiments, the angle of the rounded portion and the angled surface may reduce the likelihood of damage to the lock button 118 as face 169 pushes the lock button 118 by gradually engaging the lock button 118.

No claim element herein is to be construed under the provisions of 35 U.S.C. § 112(f), unless the element is expressly recited using the phrase "means for."

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that the construction and arrangement of the knife as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A knife, comprising:

a handle defining a slot configured to receive a spindle of a lock button, the slot having a first portion and a second portion;

a blade including a tang having a first leg and a second leg coupled to the handle, wherein the blade is rotatable between a closed position and an open position; and a locking assembly configured to secure the blade in the closed position within the handle, comprising:

the lock button including the spindle coupled to a first end button and a second end button and configured to translate between a locked position proximate the first portion of the slot and an unlocked position proximate the second portion of the slot, wherein the spindle is configured to translate within the slot such that the spindle is received between the first leg and the second leg when the blade is in the closed position and the lock button is in the locked position; and a spring arm configured to bias the lock button, wherein the spring arm biases the lock button towards the locked position while the spindle is within the first portion of the slot and biases the lock button towards the unlocked position while the spindle is within the second portion of the slot;

wherein the first leg includes an angled face configured to interface with the spindle while the lock button is in the locked position to bias the lock button to translate from the locked position to the unlocked position as the blade rotates from the open position to the closed position.

2. The knife of claim 1, wherein the handle includes a liner, wherein the spring arm is integrally formed with the liner.

3. The knife of claim 2, wherein the spring arm includes a first angled portion configured to bias the lock button towards the locked position and a second angled portion configured to bias the lock button towards the unlocked position.

4. The knife of claim 2, wherein the liner includes a liner lock configured to lock the blade in the open position.

5. The knife of claim 1, wherein the spring arm includes an inflection point, wherein the inflection point separates the first portion of the slot and the second portion of the slot.

6. The knife of claim 1, wherein the knife includes a wire spring configured to assist both opening and closing of the knife.

7. The knife of claim 1, further comprising a stopper coupled to the handle, wherein the angled face engages the stopper when the blade is in the closed position.

8. A knife, comprising:

a handle defining a first slot configured to receive a spindle of a lock button, the first slot having a first portion and a second portion;

a blade rotatably coupled to the handle and configured to rotate between a closed position and an opened position, the blade including a tang that includes a first leg and a second leg that define a second slot; and a locking assembly configured to secure the blade within the handle, comprising:

the lock button including the spindle configured to translate within the first slot between a first position and a second position and configured to be received within the second slot and interface with the first leg and the second leg when the blade is in the closed position to prevent rotation of the blade relative to the handle, and a spring arm configured to bias the lock button, wherein the spring arm biases the lock button towards the first position while the spindle is within the first portion of the first slot and biases the lock button towards the second position while the spindle is within the second portion of the first slot.

9. The knife of claim 8, wherein the spring arm is defined by a cutout in a liner of the knife.

10. The knife of claim 9, wherein the spring arm includes a first angled portion configured to bias the lock button towards the first position and a second angled portion configured to bias the lock button towards the second position.

11. The knife of claim 8, wherein the spring arm includes an inflection point, wherein the inflection point separates the first portion of the first slot and the second portion of the first slot.

12. The knife of claim 8, wherein the handle includes a liner, wherein the spring arm is integrally formed with the liner.

13. The knife of claim 8, wherein the second slot is at least partially defined by a leg, wherein the leg includes a surface opposite the second slot, wherein the surface is configured to push the spindle from the first position to the second position as the blade rotates from the opened position to the closed position.

14. A folding knife, comprising:

a handle;

a blade rotatably coupled to the handle and configured to rotate between a closed position and an opened position, the blade defining a slot defined by a first leg and a second leg, wherein the first leg includes a surface opposite the slot; and a locking assembly configured to secure the blade within the handle, comprising:

a lock button including a spindle is configured to translate relative to the handle between a first position and a second position, wherein the spindle is configured to be received by the slot in the blade to prevent rotation of the blade relative to the handle while the lock button is in the first position, and the surface is configured to push the spindle from the first position to the second position as the blade rotates from the opened position to the closed position.

15. The folding knife of claim 14, wherein the handle includes a handle slot and the spindle translates within the handle slot between the first position and the second position.

16. The folding knife of claim 15, wherein the handle slot includes a first portion and a second portion, and wherein the locking assembly further comprises a spring arm configured to bias the lock button, wherein the spring arm biases the lock button towards the first position while the spindle is within the first portion of the handle slot and biases the lock button towards the second position while the spindle is within the second portion of the handle slot.

17. The folding knife of claim 16, wherein the spring arm is defined by a cutout in a liner of the folding knife.

18. The folding knife of claim 17, wherein the spring arm includes a first angled portion configured to bias the lock button towards the first position and a second angled portion configured to bias the lock button towards the second position.

19. The folding knife of claim 16, wherein the handle includes a liner, wherein the spring arm is integrally formed with the liner.

* * * * *